United States Patent Office 3,446,944
Patented May 27, 1969

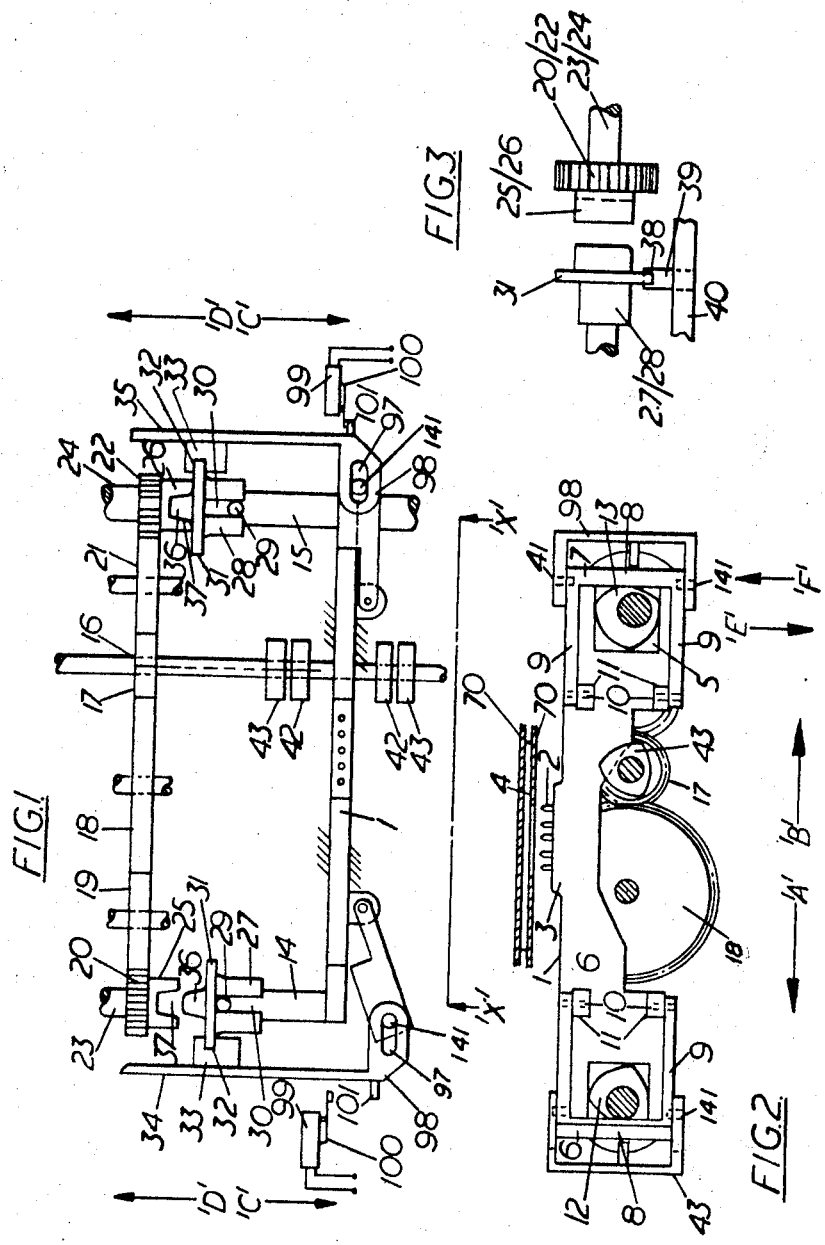

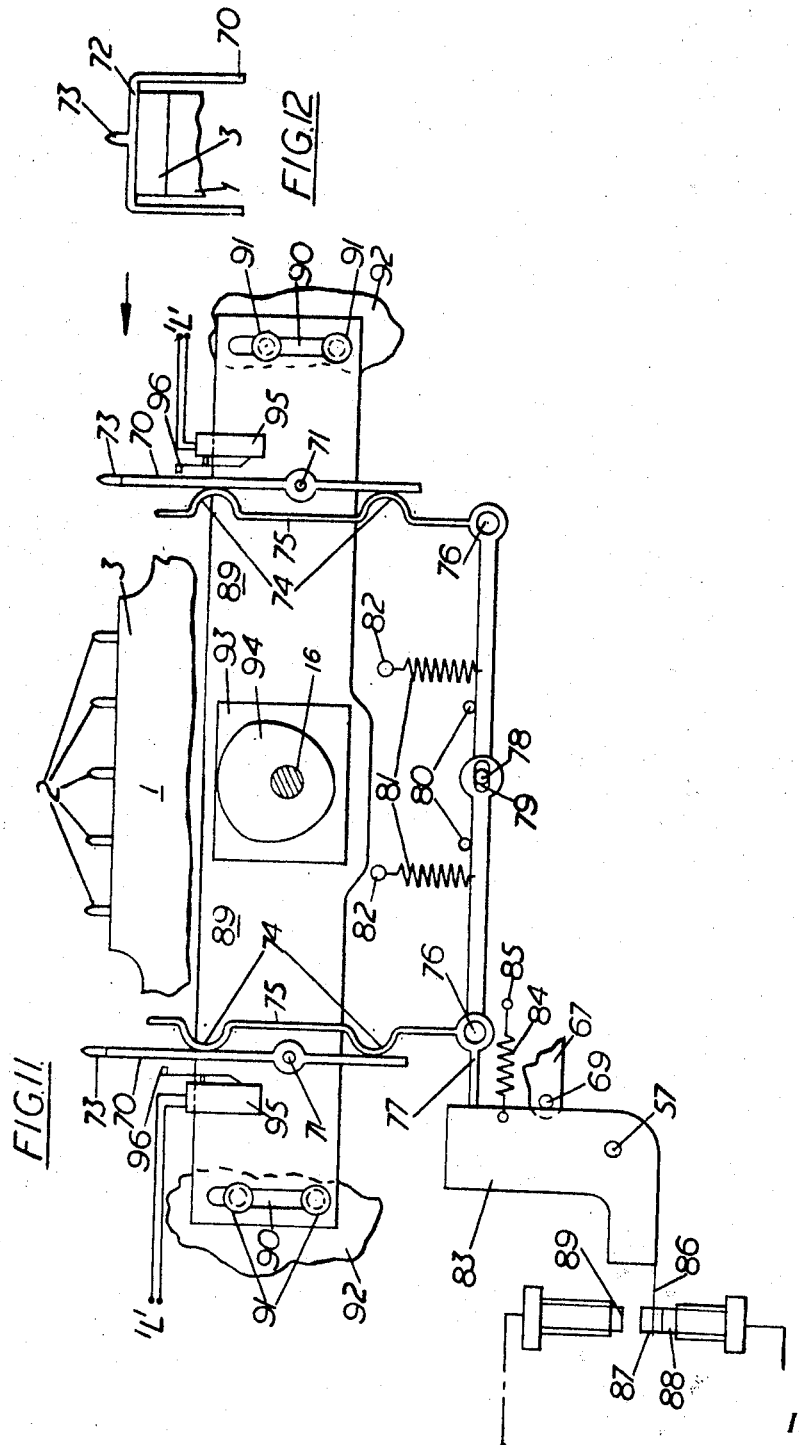

3,446,944
APPARATUS FOR READING INFORMATION FROM INFORMATION BEARING MEDIA
Arthur John Compton Soper, Croydon, Surrey, England, assignor to Creed and Company Limited, Croydon, Surrey, England, a British company
Filed Feb. 4, 1964, Ser. No. 342,433
Claims priority, application Great Britain, Feb. 14, 1963, 6,034/63
Int. Cl. G06k 7/06, 7/01
U.S. Cl. 235—61.11
11 Claims

ABSTRACT OF THE DISCLOSURE

Apparatus for feeding a perforated medium in either of two directions, and for reading code combinations of perforations therein between the feeding steps. The feeding and reading means are coupled to a common driving means, and indicating means is included for indicating that a feeding operation has been effected and in which direction the feeding step has taken place.

---

This invention relates to improvements in apparatus for feeding and reading information from information bearing media.

It is an object of the present invention to provide such apparatus of improved design and operating characteristics which incorporates facilities for feeding an information bearing medium in either one of two directions step-by-step and for reading the information between one feeding step and the next.

According to one aspect of the invention therefor there is provided apparatus for feeding an information bearing medium in one of two directions and for reading said information, said apparatus comprising means for feeding the said medium step-by-step in one of said directions or the other, means for reading said information from the medium between feeding steps, and driving means common to said feeding and reading means for effecting the feeding and reading functions alternately, According to another aspect of the invention there is provided apparatus in which said reading means comprises one or more reading devices each arranged to independently and simultaneously read information from a portion of said medium particular thereto.

The invention and its operating characteristics will be better understood from the following description read with reference to the accompanying drawings in which:

FIGS. 1, 2 and 3 show, respectively, a plan view and side and end elevations of one embodiment of a mechanism of the apparatus for feeding an information bearing medium.

FIGS. 11 and 12 show a side view and part end view respectively of a feed indicator operatively associated with the feeding mechanism of FIGS. 1, 2 and 3.

Figure 4:
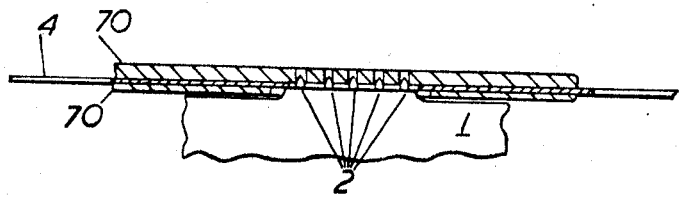
FIGS. 4 and 5, show part views of the pins of a feeding member of FIGS. 1, 2 and 3 in positions of engagement and disengagement respectively with feed hole perforations in the information bearing medium.

Referring in the first instance to FIGS. 1, 2 and 3 the feeding mechanism comprises a feeding member 1 having a number of pins 2 which extend vertically upward from a stepped portion 3 of the feeding member. These pins are spaced 1″ apart which is the pitch distance between feed hole perforations in the information bearing medium, for example, a tape.

The feed member is arranged to be driven in either of the directions indicated by the arrows A and B, to feed tape in those directions by an amount equivalent to the pitch distance between feed hole perforations therethrough. Each feeding cycle is arranged so that the following functions are performed by the feeding member 1, (a) to pivot the feeding member on one of the cams at one end thereof to cause the pins 2 to engage with feed hole perforations in the tape 4, (b) to move the tape in the appropriate direction to effect the feeding movement by the rotation of the other cam, (c) to pivot the feeding member on the other cam at the other end thereof to cause the pins 2 to disengage from the feed hole perforations in the tape and (d) to move in a reverse direction by the one cam to its initial position in preparation to effect a succeeding feeding operation.

Recesses 5, of square configuration, are provided at each end of the feeding member 1, the open ends of which recesses may be closed by means of gates. These gates are designated 6 and 7, of which gate 6 is particular to the left hand recess and gate 7 to the right hand end. Each gate comprises a vertical member 8 joining two horizontal members 9. Each gate is pivotally mounted on the feeding member 1 by way of a pair of pins 10 which extend into holes in the horizontal members 9 thereof, and which pins are affixed to pairs of lugs 11 which extend sideways from the feeding member 1. Gate 6 is shown in an open position whilst gate 7 is shown in a closed position. The term "open" meaning that the vertical member 8 of a gate is withdrawn clear of the open end of the recess 5 particular thereto, whilst the term "closed" means that the vertical member 8 of the gate is disposed to form the recess 5 into closed "box," three sides of which are formed by the three sides of the recess, the fourth side of which is formed by the vertical member 8 of the gate.

In a "closed" condition the four sides of the box constitute cam following surfaces for a cam which is enclosed in the "box," and which cam is utilised to effect a tape feeding and return movement of the feeding member 1.

A cam 12 is provided and operatively associated with the left hand "box" to effect movement of the feed member 1 to feed tape in the direction indicated by the arrow B, and a second cam 13 is provided and operatively associated with the right hand "box" to effect movement of the feed member 1 to feed tape in the direction indicated by the arrow A. The last mentioned direction being the normal direction of feeding. It is so arranged, by clutch means, later to be described, that only one of the cams is driven at a time, and that the gate particular to the "box" operatively associated with that cam is in the "closed" condition during a driving function of the cam. The other cam meanwhile being stationary and the other gate, particular to the "box" associated with the stationary cam being, in the "open" condition. The reason for the inclusion of gates and recesses, instead of permanently closed "boxes" in which the cams are accommodated, will become apparent when operation of the tape feeding mechanism is later described.

Cams 12 and 13 are affixed to rotatable shafts 14 and 15 respectively, each of which shafts is driven from a main shaft 16 and gear 17 via a train of gears and a clutch. The gears of the train for driving cam 12 are designated 18, 19 and 20, whilst the gears of the train for driving cam 13 are designated 21 and 22. Gears 20 and 22 are respectively mounted on rotatable shafts 23 and 24, and onto each of which shafts there is affixed the female members of the previously mentioned clutch means. These female members are designated 25 and 26 respectively and are arranged to be engaged respectively by the male members 27 and 28 thereof which are slidably accommodated respectively on shafts 14 and 15 driving cams 12 and 13. Pins 29 in these shafts engage in slots 30 of the male members of the clutches so that the drive, when male and female members are in engagement, is transmitted via the pins.

Each male member of a clutch incorporates a flange 31 which engages in a slot 32 in a member 33 extending from a clutch operating lever. These levers, designated 34 and 35, are particular to the clutches for cams 12 and 13 respectively. Movement of, for example, lever 35 in the direction indicated by the arrow C causes a tongue 36 on male member 28 of the right hand clutch to be withdrawn from engagement with the recess 37 in the female member 26 thereof, such that the members assume the positions of their counterparts of the left hand clutch as shown. Movement of, for example, lever 34 in the direction indicated by the arrow D causes the tongue 36 on male member 27 of the left hand clutch to move into engagement with the recess 37 in the female member 25 thereof, such that the members assume the positions of their counterparts of the right hand clutch as shown. It is so arranged, by means not shown, that only one clutch can be in a condition of engagement at a time.

In the disengaged condition of the clutches, a radial slot 38 (FIG. 3) in each of the flanges 31, of the male members of the clutch, is engaged by a pin 39 which is affixed to a member 40 of the apparatus frame. This engagement prevents the cam, particular to the clutch, from being rotated by any movement of the feeding member 1 due to rotation of the other cam in effecting tape feeding or return movements of that member.

Levers 34 and 35, in their movements to engage and disengage the members of the clutch particular thereto, are utilised to effect the closing and opening of the aforementioned gates of which gate 6 is operable by lever 34 and gate 7 by lever 35. Movement of the gates by their respective levers is effected by means of pins 141, extending from the upper and lower horizontal members 9 of the gate, which engage in elongated slots 97 in a crotch portion 98 of the lever at its end. Pairs of cams 42 and 43 are mounted on shaft 16 to effect driving functions for the tape reader. One cam of each pair is disposed on one side of the feeding member and one cam of each pair on the other side thereof. The cams of each pair are of symmetrical configuration and have the same angular relationship with each other. Their functions are to be described later herein.

Figure 5:
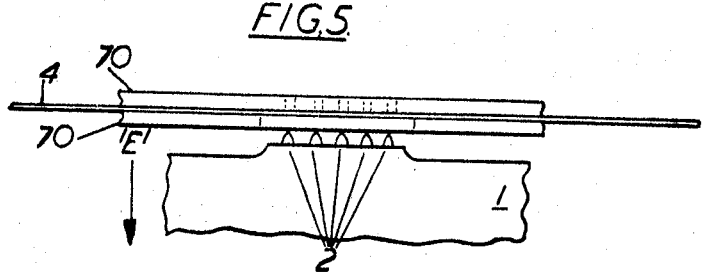

The operation of feeding tape in either one of the directions indicated by the arrow A or by the arrow B is now to be described with additional reference to FIGS. 4 and 5.

Considering in the first instance that tape has been fed in the direction indicated by the arrow B and it is now desired to feed tape in the direction indicated by the arrow A, i.e. the normal direction of feeding. The conditions obtaining at this time are that the left hand clutch is engaged, that the feeding member 1 is at the fullest extent of its leftward movement, and that the pins 3 are in engagement with the feed hole perforations in the tape 4. This condition is shown in FIG. 4 which is a part view of FIG. 1. Levers 34 and 35 are operated together by, for example, a well-known type of solenoid means (not shown) operating in response to an electric current signal. In consequence lever 34 moves in the direction indicated by the arrow C to disengage clutch members 25 and 27 whereupon the drive from shaft 16 is terminated. The slot in the flange 31 of the male member 27 of the left hand clutch moves into engagement with the pin 39 (FIG. 3) extending from member 40 of the mechanism frame, and thus rotary movement of cam 12 is prevented.

In moving, lever 34 acts on gate 6 and causes it to pivot about the axes of pins 10. In consequence the vertical member 8 of gate 6 is withdrawn clear of the open end of the recess 5 in the left hand end of the feeding member 1. The feeding member 1 is then in a condition in which it can be moved rightward without the impediment of the vertical member 8 of the gate 6 engaging the periphery of cam 12. Lever 35 moves in the direction indicated by the arrow D and in doing so moves the male member 28 of the right hand clutch into engagement with the female member 26 thereof to establish a drive from shaft 16 to cam 13 via the gear train particular thereto. In its movement lever 35 acts on gate 7 and causes it to pivot about the axis of pins 10 to dispose the vertical member 8 in a position to "close" the "box" formed by the sides of the recess 5 in the right hand end of the feeding member 1. These sides and the face of the vertical member 8 nearest the recess then form cam following surfaces for cam 13 which rotates anticlockwise.

During the first quarter of a revolution of the cam 13, it causes the feeding member 1 to pivot in a clockwise direction about an axis defined by the point or points at which cam 12 engages with side of the recess 5 in the left hand end of the feeding member, thus dropping the member downward in the direction indicated by the arrow E (FIG. 2) to cause the pins 2 to disengage from the feed hole perforations in the tape 4. This condition is shown in part view in FIG. 5.

During the second quarter of a revolution of cam 13, it causes the feeding member 1 to move rightward to a position in which it can initiate a tape feeding operation or series of operations in the direction indicated by the arrow A.

During the third quarter of a revolution of cam 13, it causes the feeding member 1 to pivot in an anticlockwise direction about the axis of its engagement with the periphery of cam 12, whereupon the feeding member 1 is raised in the direction indicated by the arrow F (FIG. 2) to cause pins 2 to engage in adjacent feed hole perforations in the tape 4 such that the condition is as shown in FIG. 4, except that the feeding member 1 is at the fullest extent of its rightward movement.

During the last quarter of a revolution of cam 13, it causes the feeding member 1 to move leftward in the direction indicated by the arrow A to feed tape in that direction through one pitch distance between adjacent feed hole perforations. Repetitions of these cycles of operation of cam 13 continue to effect feeding of the tape 4 until feeding is either terminated through stoppage of the main driving shaft 16, or a reverse tape feeding operation is initiated. Feeding of tape in the reverse direction, i.e. in the direction indicated by the arrow B is initiated by disengagement of the members of the right hand clutch whereupon the drive to cam 13 is terminated and gate 7 is opened, and by the engagement of the members of the left hand clutch whereupon the drive to cam 12 is established and gate 6 is closed. Cam 12 rotates in a clockwise direction, and the movements of the feeding member 1 are controlled by that cam to feed the tape in the direction indicated by the arrow B.

It will readily be understood that "edge coded" cards of well-known design may be fed by the mechanism which has just been described. Such cards usually include code combinations perforated therein in the two longitudinal marginal areas therealong, with feed hole perforations therein running parallel with the channels of code combination perforations in each of the marginal areas. It will be further understood that the operative members of the feeding mechanism may readily be "doubled up" so that two feeding members are operative simultaneously to effect feeding of the card by way of the two channels of feed hole perforations.

In such cases the operative members of the reading mechanism later to be described may also be "doubled up" to effect simultaneous reading of the code combinations in the two longitudinal marginal areas of the card.

Figure 6:
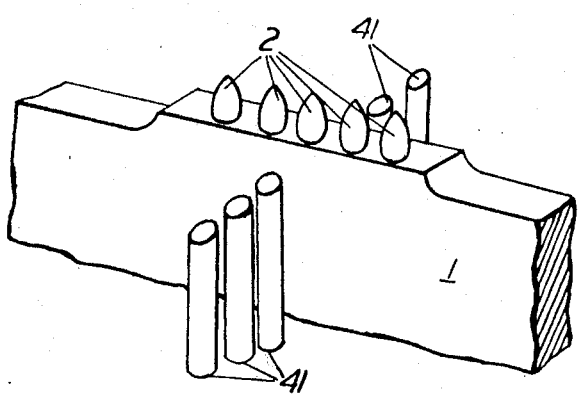
FIG. 6 shows, in perspective, the disposition of a number of code perforation sensing members with respect to the feeding member of the mechanism of FIGS. 1, 2 and 3.

FIG. 6 shows, in perspective, the disposition of the tape feeding member 1 with respect to a number of code perforations sensing members 41 which form part of the tape reader now to be described. In this particular embodiment of the tape reader five code element positions, across a tape, may be read simultaneously. However there is no reason why a greater number cannot be read in the manner to be described. The sensing members are arranged with respect to the feeding member 1 such that three are disposed on one side of it and two on the other.

Figure 7:
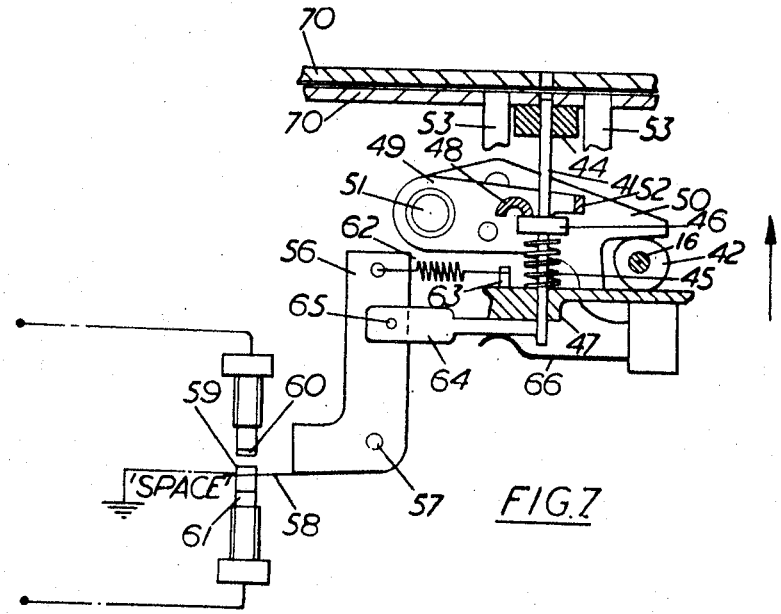
FIGS. 7, 8, 9 and 10 show various sectional views of the reader mechanism operatively associated with the feeding mechanism of FIGS. 1, 2 and 3.

FIG. 7 shows a side elevation of a line of sensing members 41 with respect to the driving shaft 16 of FIG. 1, on which shaft the cams of pairs 42 and 43 are mounted and of which one of the pair cam 42 is shown. This side elevation looks in the direction indicated by the arrows X in FIG. 1, in consequence only one sensing member can be seen. Since all the sensing members are operated to read code perforations in the tape 4 in a similar manner, the operation of others of this line can be corelated with the one shown.

The sensing members 41 are supported for vertical movement in a member 44 and a member 47 affixed to the apparatus frame, and are each biassed to move upward under the influence of a compression spring such as 45 accommodated on the sensing member and disposed between the underside of a collar 46 thereon and the top side of a member 47. The top sides of the collars 46, of the sensing members 41, are engaged by a bail 48 which is affixed to and extends horizontally between a pair of levers such one which is designated and which are attached to cam followers such as 50 and pivotable therewith, under the action of cams of the pair 42 about the axis of a spindle 51. Anticlockwise pivoting movement of cam followers 50 under the action of cams 42 will cause levers 49 to pivot in the same direction and bail 48 therebetween to move upward, which upward movement permits sensing member 41 to move in the same direction under the influence of their particular compression spring such as 45. Clockwise movement of cam followers 50 under the action of cams 42 will cause levers 49 to pivot in the same direction and bail 48 to move downward, which downward movement causes the sensing members to be moved downward against the influence of their particular compression spring 45.

Figure 8:
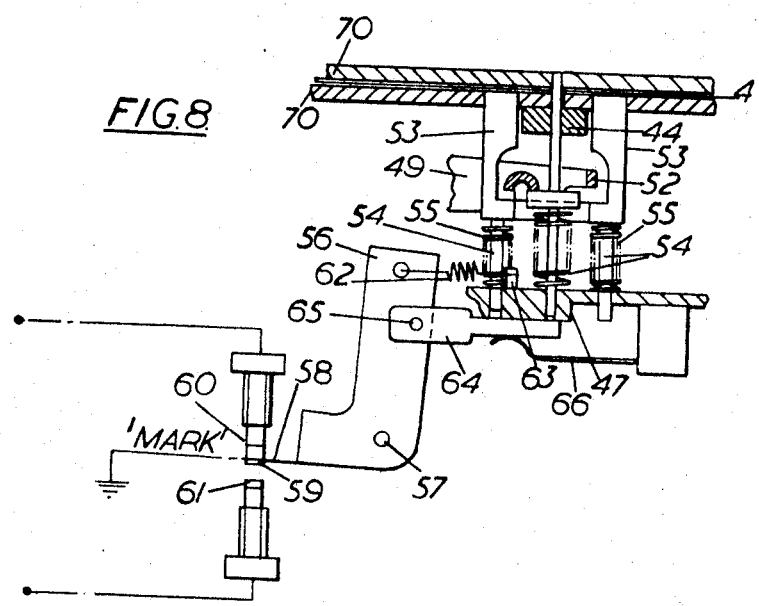

An arm 52 also extending horizontally between levers 49 is utilised to control movements of plungers 53 (FIG. 8) for each sensing member. These plungers are supported for vertical movement at their top ends in recesses in the lower one of two plates 70 and by pins 54 extending therefrom into holes in the member 47 of the apparatus frame. Plates 70 constrain the tape for guidance therebetween during tape feeding operations, and are affixed to the apparatus frame. Compression springs 55 are accommodated on each of the pins 54 and located between the undersides of the plungers and the upper side of the member 47. It will readily be understood that any movement of levers 49, in an anticlockwise direction about the axis of spindle 51, will permit the plungers 53 to move upward under the influence of compression springs 55. To each of the sensing members 41 there is thus appendent thereto, a code lever such as 56 (FIGS. 7 and 8) which is pivotally mounted on a rod 57 affixed to the apparatus frame.

Each code lever incorporates a tongue 58 on which double sided contact 59 is carried, and it is arranged that this contact engages either contact 60 or contact 61 to indicate respectively a "mark" condition or a "space" condition sensed, by its respective sensing member 41 in the code element position particular thereto in the tape 4.

Each code lever 56 is biassed by a tension spring 62, affixed at its ends to the code lever and a pin 63 extending from member 47 of the apparatus frame, to move in a clockwise direction about the axis of rod 57.

A latch member 64 is pivotally attached to each one of the code levers 56 by way of a pin 65 and is biassed by a leaf spring 66 affixed at one end to member 47 of the apparatus frame. The biassing actions of tension springs 62 on code levers 56 cause the free ends of latch members 64 to engage against side portions of the sensing members 41 at their lower ends when these members are in their fully or partially downward positions.

A further pair of cam followers 67 one of which pair is shown in the part view (FIG. 9) are pivotally mounted on pins such as 68 affixed to cam followers 50, but independently controlled in a pivoting action about pins 68 by a cams of the pair 43 on shaft 18. A rod 69 extends between these cam followers and engages against each one of the vertically disposed members of the code levers 56.

Operation of the tape reader is now to be described with the consideration that the actual reading operation is timed to take place between successive feed movements of the tape, the angular relationship between whichever one of cams 12 and 13 is operative and the cams of the pairs 42 and 43 being such that correct timing results. In the first instance a reading operation is to be described with respect to feeding of the tape in the normal direction of feeding, i.e. in the direction indicated by the arrow A of FIG. 1.

In the first quarter of a revolution of cam 13 (FIGS. 1 and 2), during which time the feed member 1 is lowered to withdraw the pins 2 from engagement with the feed hole perforations in the tape 4, cams of the pairs 42 and 43 (FIGS. 7 and 9) are also rotating through their first quarter revolution. The rotation of cams of the pair 42 causes cam followers 50 to pivot anticlockwise about the axis of shaft 51. In consequence levers 49, and bail 48 and arm 52 therebetween, pivot in the same direction. This pivoting of arm 52 permits plungers 53 to move upward, under the influence of compression springs 55, through the lower one of plates 70 to engage and cause the tape 4 to be gripped between the upper faces of the plungers 53 and the underside of the upper one of plates 70. Thus gripped, the tape 4 is prevented from movement during withdrawal of pins 2 (FIGS. 1 and 2) from the tape through the downward movement of feeding member 1 and a following reading operation. Pivoting of the bail 48 and its consequent movement upward permits all the sensing members 41 to move upward under the influence of their particular compression springs 45. Upward movement of the sensing members is terminated when any one engages the tape 4 in which "no hole" (indicating a "space" element of a code combination of elements) is present, and those of the sensing members which encounter a "hole" (indicating a "mark" element of a code combination of elements) are permitted to follow the full upward movement of the bail 48 as they pass through perforations in the tape 4.

Figure 10:
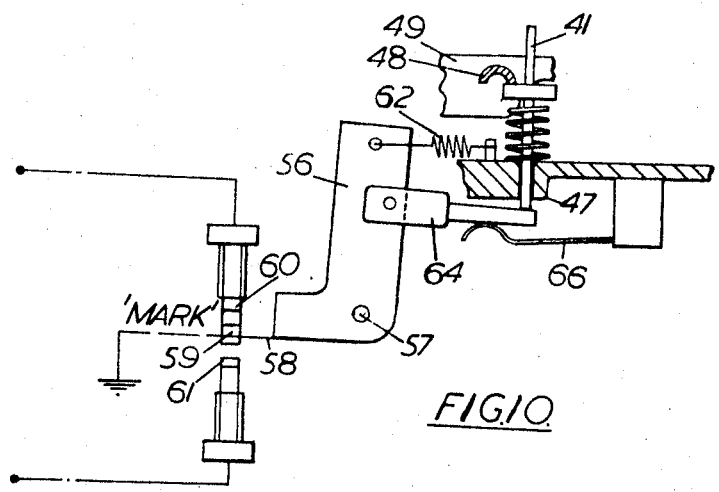

Full upward movement of these sensing members 41, encountering "holes" indicating "mark" conditions, causes the lower ends thereof to be moved clear of the free ends of latches 64 particular thereto. The other sensing members 41, remaining in positions to which they were moved partially upward, maintain their engagement with the latches 64 particular thereto as shown in FIG. 10.

Rotation of cams of the pair 43 (FIG. 9), during this first quarter of its revolution, act on cam followers 67 to pivot them in a clockwise direction about the axes of the pins 68. In consequence those of the code levers 56 previously pivoted in clockwise direction about the axis of rod 57, to indicate "mark" condition of elements of the previous code combination read thereby, are pivoted in an anticlockwise direction against the influence of their tension springs 62, under the action of rod 69 between cam followers 67, such that they revert to a position where their double sided contacts 59 engage with contacts 61 to indicate "space" conditions. At this stage in the reading cycle, all code levers are set to indicate "space" conditions.

In the second quarter of a revolution of cam 13 (FIGS.

1 and 2), during which time the feeding member 1 is returned to its rightward position in preparation for effecting the next tape feeding movement leftward, cams 42 and 43 (FIGS. 7 and 9) are also rotating through their second quarter of a revolution. The profiles of cams of the pair 42 over the 90° arc thereof engaging cam followers 50 during the second quarter of a revolution are such that no pivoting movement of the cam follower takes place. Thus the sensing members 41 and the plungers 53 remain upward in the positions to which they were moved by the bail 48 and the arm 52 respectively during the first quarter revolution of cams of the pair 42.

Cams of the pair 43 (FIG. 9), rotating through their second quarter of a revolution, cause cam followers 67 to pivot about the axes of pins 68 in an anticlockwise direction whereupon rod 69 therebetween permits those of code levers 56 whose latches 64 are unimpeded for rightward movement, by the lower ends of the sensing members 41 indicating "space" conditions of elements of the current code combination being read, to pivot about the axis of rod 57 in a clockwise direction under the influence of their respective tension springs 62. In consequence of this pivoting the double sided contact 59, on the tongues 58 of pivoted code levers, move from engagement with contacts 61 into engagement with contacts 60 to indicate "mark" conditions. At this time then the "mark" and "space" conditions of the elements of the currently read code are registered by the positions of the code levers 56. Those of the code levers in positions where the double sided contacts 59 thereof are in engagement with contacts 60 registering "mark" conditions, and those of the code levers in positions where the double-sided contacts thereof are in engagement with contacts 51 registering "space" conditions.

It is so arranged that these "mark" and "space" conditions of elements of the code combinations are translated into electric current signals through engagement of the contacts 59 and 60, and 59 and 61 respectively to close electrical circuits associated therewith.

In the third quarter of a revolution of cam 13 (FIGS. 1 and 2), during which time the feed member 1 is raised to cause the pins 3 thereof to engage in feed hole perforations in the tape 4, cams of the pairs 42 and 43 (FIGS. 7 and 9) are also rotating through their third quarter of a revolution. The profiles of cams of the pair 43, over the 90° arc thereof engaging cam follower 67 during this third quarter of a revolution, are such that no pivoting of the cam followers 67 takes place and thus no direct pivoting action is asserted on code levers 56.

However, cams of the pair 42 in their third quarter of a revolution act upon cam followers 50 causing them to pivot in a clockwise direction about the axis of shaft 51 whereupon the arm 52 therebetween engaging plungers 53 cause the plungers to move downwards, against the influence of their respective compression springs 55, out of engagement with the tape 4. Simultaneously with the movement of the arm 52, bail 48 engaging the collars 46 of sensing members 41 indicating "mark" conditions cause these sensing members to move downward against the influence of their tension springs 45 on the collars 46 of these sensing members. Those of the sensing members 41 which were only partially moved upward during the reading operation, and indicative of space elements, are also engaged by the bail 48 in its downward movement so that all the sensing members are returned to their initial downward positions together. In their downward movement, those of the sensing members 41 (FIG. 10) which have indicated mark conditions, engage with their lower ends their respective latch members 64 which are pivoted in a clockwise direction about the axis of pins, such as 65, against the influence of leaf springs such as 66. These latches are moved clear of the ends of their respective sensing members when the code levers particular thereto are re-set in the first quarter of the next reading cycle to indicate "space" conditions.

In the fourth and last quarter of a revolution of cam 13 (FIGS. 1 and 2) in the feeding cycle, this cam acts on the feeding member 1, the pins 2 of which are in engagement with feed hole perforations in the tape, to move it leftward and to feed tape in that direction by one pitch distance so that a succeeding code combination of elements is presented to the reader in the reading position. Code levers 56 are all re-set to indicate "space" conditions during the first quarter of the next reading cycle and in the manner previously described.

Referring now to FIGS. 11 and 12 of the drawings these figures show respectively a side view and part end view of a mechanism for indicating in which direction tape feeding is taking place. The position of this mechanism is shown relative to the feeding member 1 and particularly to the stepped portion 3 of the feeding member and the pins 2 extending vertically upward therefrom.

The presently referred to mechanism comprises a pair of feed hole seeking members, each of which is pivotally mounted on rod 71 affixed to a portion of the apparatus frame. These seekers are in the shape of an inverted U and are constituted by, as shown in the part end view of FIG. 12 (looking in the direction indicated by the arrow) two vertical members 70, horizontal members 72, and a pin 73 extending vertically upward midway between the top ones of the horizontal members. The pins 73 of the seekers are of the same configuration as the pins 2, extending from the vertical extension 3 of the feeding member 1, and have the purpose of engaging in feed hole perforations in the tape in order to indicate that feeding of the tape is taking place, and to independently indicate also the direction of feed.

The spindle 71, on which each seeker is pivotally mounted, extends between a pair of cam following members such as the one shown and designated 89. These cam following members are each supported for vertical movement by way of elongated slots 90 on pairs of guide pins 91 which are affixed to portions, such as 92, of the apparatus frame. Each cam following member incorporates a cut-out portion 93 which accommodates a cam of a pair of cams such as 94 and which cams are mounted on shaft 16 shown in some of previous figures. The cams 94 are arranged to rotate in synchronism with cams of pairs 42 and 43 (FIG. 1).

The design of the cams of the pair 94 is such that the cam following members 89 move vertically upward and downward in synchronism with the upward and downward movement of the feeding member 1. Thus the pins 73 of the seekers, carried by the cam following members 89, move upward and downward in synchronism with the pins 2 of the feeding member 1.

The seekers are arranged, one to the left and one to the right, of the vertical extension 3 of the feeding member 1, such that their vertical members 70 straddle the feeding member 1 as shown in FIG. 12, and such that the pins 73 thereof are in alignment with the pins 2 extending from the vertical extension 3 of the feeding member 1.

Each of the seekers is arranged to be engaged, at positions therealong above and below the spindle 71, on which they pivot, by arcuate protuberances 74 extending outwardly from the side of a member 75 of L shaped configuration. Each L shaped member is pivotally arranged on a rod 76 affixed to a portion of the apparatus frame, the axis about which each L shaped member pivots being co-incident with the point of intersection between the vertical and horizontal members thereof. The lefthand L shaped member incorporates a tongue 77 extending therefrom, which tongue is arranged to engage and disengage a lever 83 which is later to be described.

The horizontal members of the L shaped members 75 are pivotally linked at their adjacent ends by a pin 78, extending from the right hand one, which engages in an elongated slot 79 in the left hand one. The left and right hand L shaped members are biased to pivot in anticlockwise and clockwise directions respectively, each about the axis of the rod 76 particular thereto to cause, under certain conditions, the horizontal members to engage each against a stop pin 80 affixed to a portion of the apparatus frame. This biassing is effected by tension springs 81 each affixed at its ends to the member that it is particular to, and to a pin 82 affixed to a portion of the apparatus frame.

The tongue 77 extending from the horizontal member of the lefthand L shaped member 75 is arranged to engage or disengage with the vertical member of a lever 83 which is of the same configuration as code levers 56, and pivotally mounted on the rod 57 in common with the code levers 56.

Figure 9:
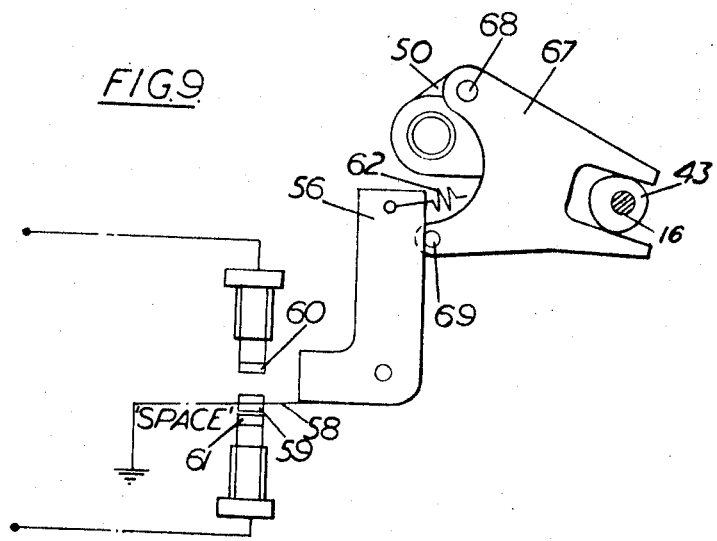

A tension spring 84, affixed at its ends to lever 83 and to a pin 85 extending from a portion of the apparatus frame, biasses the lever in a clockwise direction about the axis of rod 57 in a similar manner to the code levers 56 to engage against the rod 69 extending between cam followers 67 of FIG. 9.

The lever 83, in common with code levers 56, incorporates a tongue 86 on which a double sided contact 87 is carried, and it is arranged that this contact is either in engagement with contact 88 or with contact 89. Particular to each of the feed hole seeking members, there is a well-known type of electric switch 95 (FIG. 11) affixed to the apparatus frame. Each switch is positioned such that the operating aim 96 thereof is engageable by a vertical member 70 of one of the feed hole seeking members. The arrangement therebetween being such that pivoting of the left and right hand feed hole seeking members in anticlockwise and clockwise directions respectively causes the vertical members 70 thereof to engage the operating aims 96 of their respective electric switches 95 to effect opening and/or closure of contacts therein. These switches provide means for effecting indication of the direction in which tape is being fed and/or means for performing a function in exterior equipment as the result of tape being fed in a particular direction. This aspect of the function of the switches is to be described later herein. An alternative arrangement for indicating the direction in which tape is being fed may be incorporated in the mechanism of FIGS. 1 and 2. These means comprising well known types of electric switches 99 affixed to the apparatus frame such that the operating aims 100 thereof are engageable by pins 101 affixed to the left and right hand clutch operating levers 34 and 35. Operation of a lever to engage a clutch particular thereto will cause the operating aim 100 of the switch 99 particular thereto to be engaged by the pin 101, whereupon the contacts of the switch may be closed to give an indication of the direction in which tape is being fed. These contacts may be arranged in an electric circuit to give visual and/or audio indication in a well-known manner, or utilised to complete a circuit to effect a function as a result of feeding of the tape taking place in a particular direction. By duplicating the reading mechanism just described, with the necessary inclusion of the cam means for driving the mechanism from the common source, simultaneous reading of code combinations carried as perforations in the two longitudinal marginal of "edge-coded" cards areas may be effected.

More than two such mechanisms can be included, if required, to read information from the edge coded card therealong in the places where such information has been recorded in separate sets of channels.

Operation of one form of the feed indicating mechanism is now to be described with reference to FIGS. 11 and 12.

The feed indicating operating cycle is initiated at the commencement of the third quarter of a revolution of either one of cams 12 or 13 (FIG. 2) during which time the feeding member is raised to cause the pins 2 thereof to engage in feed hole perforations in the tape 4.

As the feeding member 1 is raised, cam following members 89 (FIG. 11) are moved vertically upward under the action of cams 94 carrying the feed hole seeking members therewith, by way of spindles 71. As the pins 2 of the feeding member 1 engage in feed hole perforations in the tape, so do the pins 73 of the feed hole seeking members. In the next i.e. fourth and last quarter of a revolution of, for example, cam 13 (FIG. 2), leftward feed of the tape 4 takes place. During this fourth and last quarter of a revolution, the configuration of the cams of the pair 94 are such that the cam following members 89 are maintained stationary in their upward positions. Movement of the tape 4 with pin 73 engaging therein causes the feed hole seeking members to be pivoted anticlockwise about the axes of spindles 71. Pivoting of the left and right hand feed hole seeking members cause consequential pivoting of the left and right hand L shaped members 75 in clockwise and anticlockwise directions respectively about the axes of spindles 76. This pivoting of the left and right hand L shaped members 75 being effected respectively through the engagement of the lower and upper ones of the arcuate protuberances 74 of the vertical members thereof with the lower and upper ends of the left and right hand feed hole seeking members respectively.

In consequence of the pivoting of the L shaped members 75, the linkage between the horizontal members thereof moves downward, pivoting taking place against the influence of the tension springs 81. Pivoting of the lefthand L shaped member 75 causes the tongue 77, extending from the lower member thereof to pivot in the same direction clear of the upper end of lever 83. This lever is then permitted to pivot about the axis of rod 57 under the influence of tension spring 84, whereupon the double sided contact 87 moves out of engagement with contact 88 into engagement with contact 89. An electrical circuit is then operated to, for example, light a lamp or sound a warning to indicate that feeding of the tape has taken place. In addition, or alternatively, this closure of the contacts may be utilised to complete an electric circuit to perform a function in some other equipment in consequence of feeding of the tape having taken place. Pivoting of the left hand feed hole seeking member causes the particular vertical member 70 thereof to engage the operating aim 96 of its respective switch 95. This engagement causes closure of the contacts of the switch to complete an electric circuit to give visual and/or audio indication by well-known means that tape is being fed leftward. Closure of contacts of the switch may also be utilised to close an electric current circuit to perform a function in consequence of leftward feed of tape.

Figure 13:
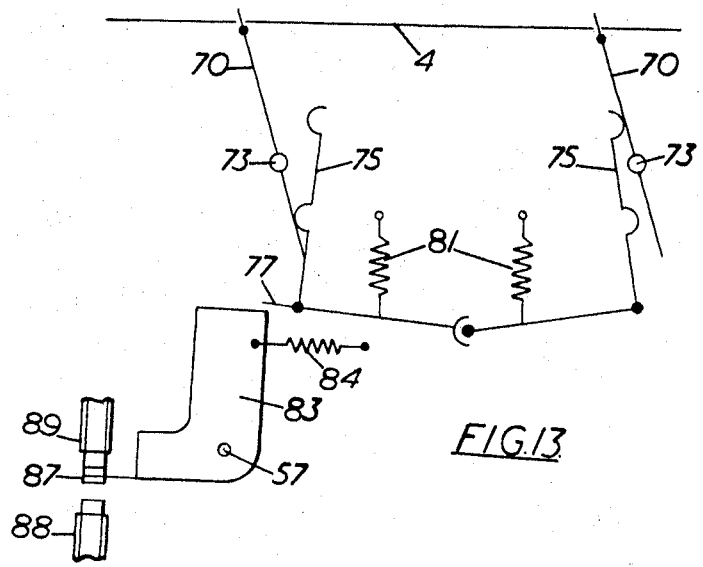
FIGS. 13 and 14 show, schematically, the conditions obtaining in the feed indicator during its operation to effect indication that feeding of the information bearing medium is being effected.

FIG. 13 shows, schematically, the conditions obtaining in the mechanism, after feeding of the tape in the leftward direction has taken place.

During the first quarter of a revolution of cam 13 (FIG. 2) in the ensuing cycle of rotation thereof, this cam causes the feeding member 1 to be lowered so that the pins 2 thereof are withdrawn from engagement with feed hole perforations in the tape 4. In synchronism with the lowering of the feeding member 1, cam following members 89 (FIG. 11) move vertically downward permissively under the action of cams of the pair 94. This downward movement withdraws the pins 73 of the feed hole seeking members from engagement with the feed holes in which they previously engaged. Simultaneously cam followers 67 (FIGS. 9 and 11) under the action of cams of the pair 43, pivot in a clockwise direction about the axis of pins 68 (FIG. 9) to pivot code levers 56 in an anticlockwise direction about the axis of rod 57. This pivoting action of the code levers 56 is effected by rod 69 engaging with vertical members thereof as previously described, the code levers are thus reset to the conditions in which the associated contacts register "space" conditions. It has already been explained that lever 83 (FIG. 11) is also pivotably accommodated on rod 57 and engaged by rod 69, thus the lever 83 is also pivoted in an anticlockwise direction about the axis of rod 57 against the influence of tension spring 84. In consequence of the pivoting of lever 83 the double sided contact 87 carried on the tongue 85 thereof is moved out of engagement with contact 89 back into engagement with contact 88. In this condition of the contacts, a circuit may be completed to perform a function in exterior equipment.

As the pins 73 of the feed hole seeking members are withdrawn, there is no restraint imposed on the L shaped members 75 to maintain the link between the horizontal members thereof in the downward position, thus the left and right hand L shaped members 75 pivot anticlockwise and clockwise respectively under the influence of tension springs 81 until the horizontal members engage with the stop pins 80. The mechanism thus reverts to the condition shown in FIG. 11.

In rightward movement of the tape 4, the feed hole seeking members are caused to pivot in clockwise directions, about the axes of spindles 71 when the pins 73 thereof engage in feed hole perforations in the tape 4. This pivoting causes a vertical member 70 of the right hand feed hole seeking member to engage with the operating aim 96 of its respective switch 95. This engagement causes closure of the contacts of the switch 95 to complete an electric circuit via lines L to provide an indication by, for example, visual or audio means that rightward feed of the tape is taking place. Closure of the contacts of this switch may also as with the other of these switches, be utilised to complete an electric circuit to perform a function in consequence of rightward feed of the tape having taken place.

Pivoting of the feed hole seeking members in the clockwise direction causes the left and right hand L shaped members 75 to pivot in clockwise and anticlockwise directions respectively about the axes of spindles 76. This pivoting of the left and right hand L shaped members 75 being effected respectively through the engagement of the upper and lower ones of the arcuate protuberances 74 of the vertical members thereof with the upper and lower ends of the left and right hand feed hole seeking members.

Throughout the rest of the cycle, lever 83 is caused to pivot about the axis of rod 57 as previously described. This pivoting action causing the double sided contact 87 to move out of engagement with contact 88 into engagement with contact 89. This changeover of contacts being utilised to perform the same functions as before during the leftward feed of the tape.

Figure 14:
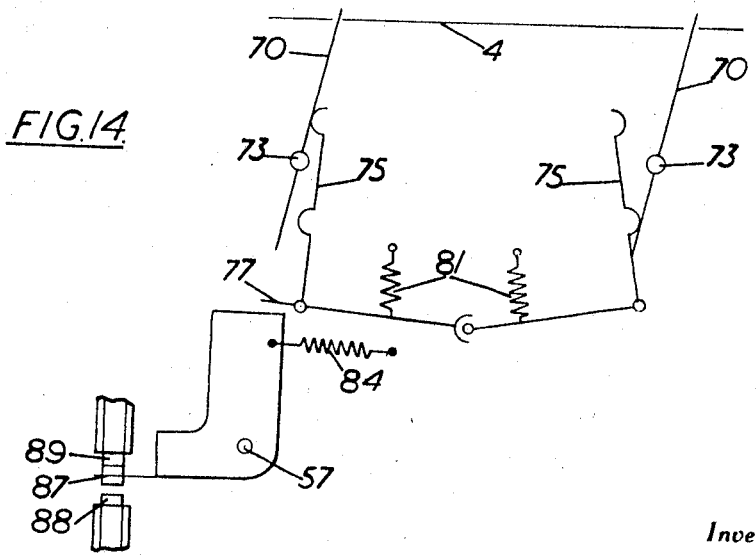

FIG. 14 shows, schematically, the conditions obtaining in the mechanism, after feeding of the tape in the rightward direction has taken place.

Reversion of the mechanism to the condition shown in FIG. 11 is effected in the same manner as previously described.

It will further be understood that the feed indicating mechanisms described herein are applicable to the feeding mechanism when it is utilised to effect feeding of "edge coded" cards.

It is to be understood that the foregoing description of specific examples of this invention is not to be considered as a limitation on its scope.

What I claim is:

1. Apparatus having means for feeding a perforated medium in one of two directions and means for reading code combinations of perforations therein between feeding steps comprising:

common driving means coupled to drive said feeding and reading means;

said feeding means including a feeding member adapted to engage and feed said medium;

first and second clutch means including means, for selectively coupling said clutch means to said driving means;

first and second cam means coupled to said first and second clutch means respectively, such that when said first clutch means is coupled to said driving means, said first cam means effects movement of said feed member to cause the step-by-step feeding of said member in one of said two directions, and when said second clutch means is coupled to said driving means, said second cam means effects movement of said feed member to cause the step-by-step feeding of said member in the other of said two directions;

said reading means include a code lever and an associated sensing member for each element of said code combinations of perforations;

sensing cam means for causing said associated sensing member to sense said medium for a code element perforation therein and, upon finding said code element perforation, to set said code lever to its particular position indicative of the code element sensed; and resetting cam means which, after each reading operation, resets each code lever and its associated sensing member to a rest position.

2. Apparatus according to claim 1 in which each of sensing member, of a set of sensing members, is arranged to independently and simultaneously read information from a portion of the said medium particular to said set of sensing members.

3. Apparatus according to claim 1 in which a control lever is provided to control each said first and second clutches, and wherein solenoid means, operative in response to an electric current signal, operate said levers, said solenoid means being so arranged that engagement of one of said clutches is effected simultaneously with the disengagement of the other.

4. Apparatus according to claim 3 in which said feeding member has first and second recesses to receive said first and second cam means respectively, and in which the surfaces of each said recess and a surface of a gate means particular to that recess form a box whose sides act as cam following surfaces for the cam thereof, which cam acts on the said surfaces to cause said feeding member to feed the medium in the appropriate direction.

5. Apparatus according to claim 4 in which said feeding member includes a plurality of pins extending therefrom, said pins being arranged to engage in feed hole perforations in said medium to effect feeding movements thereof.

6. Apparatus according to claim 5 in which the inoperative one of said first and second cam means acts as a pivot for said feeding member by the operative one of said first and second cam means during a feeding cycle thereof, the said cycle comprising movements of said feeding member to engage and feed the medium in the appropriate direction and then to disengage the tape and return to an initial position in preparation for a subsequent feeding cycle.

7. Apparatus according to claim 1 including means for indicating that said medium is being fed in either one of said two directions by said tape feeding means.

8. Apparatus according to claim 7 in which said indicating means comprises a pair of feed hole perforation seeking members, means for causing said seeking members to engage in feed hole perforations in said medium and to be pivoted by said medium feeding thereof by a feeding means, and means engaged by said seeking members due to the pivoting thereof and operative in consequence of the pivoting to complete an electric circuit and effect said indication.

9. Apparatus according to claim 3 further including indicating means comprising a pair of feed hole seeking members, means for causing said seeking members to engage in feed hole perforations in the medium and to be pivoted by the medium during the feeding thereof by said feeding means, means engaged by one of said seeking members when it pivots to complete an electric circuit to effect an indication that the medium is being fed in said one of the two directions, and means engaged by the other of said pair of seeking members during pivoting thereof and operative thereupon to complete an electric circuit to effect another indication that the medium is being fed in said other of the two directions.

10. Apparatus according to claim 9 in which said medium is a tape.

11. Apparatus according to claim 9 in which said medium is a card.

References Cited

UNITED STATES PATENTS 3,217,141  11/1965  MacNeill ......... 235—61.11
2,819,020  1/1958  Baer et al. ......... 235—61.11

DARYL W. COOK, *Primary Examiner.*